US008477959B2

(12) United States Patent
Yamkovoy

(10) Patent No.: US 8,477,959 B2
(45) Date of Patent: Jul. 2, 2013

(54) REVERSIBLE PERSONAL AUDIO DEVICE CABLE COUPLING

(75) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 943 days.

(21) Appl. No.: 12/423,503

(22) Filed: Apr. 14, 2009

(65) Prior Publication Data

US 2010/0260361 A1 Oct. 14, 2010

(51) Int. Cl.

| | |
|---|---|
| ***H04R 1/10*** | (2006.01) |
| ***H04R 5/02*** | (2006.01) |
| ***H04R 25/00*** | (2006.01) |
| ***H04M 1/00*** | (2006.01) |

(52) U.S. Cl.
USPC ......... 381/74; 381/384; 381/309; 379/433.01

(58) Field of Classification Search
USPC ........... 381/309, 74, 26, 370, 384, FOR. 149; 379/430, 428.01, 428.02; 455/575.2
See application file for complete search history.

(56) References Cited

U.S. PATENT DOCUMENTS

| | | | | |
|---|---|---|---|---|
| 6,744,901 | B2 * | 6/2004 | Ito et al. | 381/374 |
| 6,873,862 | B2 | 3/2005 | Reshefsky | |
| 2003/0022703 | A1 * | 1/2003 | Reshefsky | 455/569 |
| 2006/0013410 | A1 * | 1/2006 | Wurtz | 381/74 |
| 2006/0159279 | A1 * | 7/2006 | Kuo et al. | 381/74 |
| 2007/0230709 | A1 * | 10/2007 | Wedge | 381/2 |
| 2008/0137896 | A1 | 6/2008 | Tsen | |
| 2009/0323975 | A1 * | 12/2009 | Groesch | 381/71.1 |

FOREIGN PATENT DOCUMENTS

| | | | |
|---|---|---|---|
| WO | 9913682 | A2 | 3/1999 |
| WO | 2007035020 | A1 | 3/2007 |

OTHER PUBLICATIONS

EP Extended Search Report dated Aug. 11, 2010 for EP Appln. No. 10159120.4.

* cited by examiner

*Primary Examiner* — Matthew Landau
*Assistant Examiner* — Khaja Ahmad

(57) ABSTRACT

A apparatus and method for enabling signals representing a first audio channel and a second audio channel to be conveyed to a first earpiece and a second earpiece, respectively, regardless of which of the first and second earpieces a cable providing both the signals representing the first and second audio channels is coupled to, wherein a first acoustic driver of the first earpiece acoustically outputs the first audio channel and a second acoustic driver of the second earpiece acoustically outputs the second audio channel.

10 Claims, 5 Drawing Sheets

REVERSIBLE PERSONAL AUDIO DEVICE CABLE COUPLING

TECHNICAL FIELD

This disclosure relates to personal audio devices worn on or about the head of a user in the vicinity of the ears and coupled via a cable to another device.

BACKGROUND

It has become commonplace for personal audio devices worn on or about the head of a user in the vicinity of the ears and coupled via a cable to another device to acoustically output stereo audio provided by the other device to the ears such that each ear is provided with distinct left and right audio channels. Examples of such personal audio devices include headphones that may be coupled to another device such as a CD player, an entertainment radio, a television or a MP3 player, and include headsets that may be coupled to another device such as a two-way radio or telephone.

However, despite the widespread use of such personal audio devices, users of such personal audio devices often find themselves inconvenienced by the cable that couples such personal audio devices to another device. In essence, users find themselves effectively “tethered” to the other device to which such a personal audio device is coupled such that some degree of flexibility in moving about is lost. Users have often found it necessary to position themselves and/or limit their own movements to avoid putting sufficient tension on the cable to cause the coupling between such a personal audio device and the other device to which it is coupled to be broken, e.g., by pulling apart connectors at one end of the cable.

A commonplace solution to this inconvenience has been the use of wireless signaling between such personal audio devices and another device. However, such use of wireless signaling has drawbacks, including the frequent use of batteries with personal audio devices such that use of a personal audio device is limited by the power storage capacity of a battery. Further, issues of electromagnetic interference between devices may arise as a result of using at least some forms of wireless signaling that employ radio frequency transmissions.

Another solution to this inconvenience in the case of headsets having a pair of earpieces to acoustically output stereo audio and a communications microphone to enable two-way communications, is to enable the cable to be coupled to either of the earpieces. In this way, a user is provided with at least the flexibility to decide whether they wish to have the cable “tethering” them to another device from either the left side or the right side of the headset. To enable the coupling of the cable to either earpiece, existing known implementations of such headsets have both left and right audio channel conductors, along with a ground conductor, carried by a headband that connects the two earpieces. When the cable is coupled to the left earpiece, right channel audio and ground are conveyed through the headband to the right earpiece. Similarly, when the cable is coupled to the right earpiece, the left channel audio and ground are conveyed through the headband to the left earpiece.

Unfortunately, by having both left and right audio channel conductors carried within the headband, left channel audio is conveyed along with right channel audio to the right earpiece when the cable is coupled to the left earpiece, and right channel audio is conveyed along with left channel audio to the left earpiece when the cable is coupled to the right earpiece, despite the fact that the conveying both left and right channel audio from one earpiece to the other in each of these situations is entirely unnecessary. Indeed, in existing known implementations of such headsets, whichever one of the left and right audio channel conductors is rendered unnecessary (depending on which one of the earpieces the cable is coupled to) is also allowed to remain unterminated, thereby causing the unnecessary one of these conductors to act in a manner akin to an antenna, receiving and introducing electromagnetic interference into one or the other of the left and right audio channel.

SUMMARY

A apparatus and method for enabling signals representing a first audio channel and a second audio channel to be conveyed to a first earpiece and a second earpiece, respectively, regardless of which of the first and second earpieces a cable providing both the signals representing the first and second audio channels is coupled to, wherein a first acoustic driver of the first earpiece acoustically outputs the first audio channel and a second acoustic driver of the second earpiece acoustically outputs the second audio channel.

In one aspect, a personal audio device includes a first earpiece having a first acoustic driver to acoustically output a first audio channel and a first connector, a second earpiece having a second acoustic driver to acoustically output a second audio channel and a second connector, a band coupling the first and second earpieces, and a crossover audio conductor carried by the band between the first and second earpieces. The crossover audio conductor is coupled to both the first and second connectors to convey a signal representing the first audio channel from the second earpiece to the first earpiece to be acoustically output by the first acoustic driver at a time when a cable providing signals representing both the first channel audio and the second channel audio is coupled to the second connector; and to convey the signal representing the second audio channel from the first earpiece to the second earpiece to be acoustically output by the second acoustic driver at a time when the cable is coupled to the first connector.

Implementations may include, and are not limited to, one or more of the following features. The personal audio device may further include a first audio channel conductor coupling the first acoustic driver to the first connector, a second audio channel conductor coupling the second acoustic driver to the second connector, and a plug that couples the first audio channel conductor to the crossover audio conductor when the plug is coupled to the first connector, and that couples the second audio channel conductor to the crossover audio conductor when the plug is coupled to the second connector. The personal audio device may further include a ground conductor carried by the band between the first and second earpieces, and coupled to both the first and second connectors and both the first and second acoustic drivers.

The personal audio device may further include a power conductor carried by the band between the first and second earpieces, and coupled to both the first and second connectors. The personal audio device may further include a first powered circuit coupled to the power and ground conductors, and coupled to the first acoustic driver; a first audio channel conductor coupling the first powered circuit to the first connector; a second powered circuit coupled to the power and ground conductors, and coupled to the second acoustic driver; a second audio channel conductor coupling the second powered circuit to the second connector; and a plug that couples the first audio channel conductor to the crossover audio conductor when the plug is coupled to the first connector, and that couples the second audio channel conductor to the crossover audio conductor when the plug is coupled to the second connector. The first and second powered circuits may provide active noise reduction in at least one of the first earpiece and the second earpiece, may amplify signals representing one or both of the first and second audio channels, and/or may cooperate to provide the personal audio device with wireless communications capabilities.

The personal audio device may further include a communications microphone. The communications microphone may be able to be coupled to either one of the first and second connectors. The personal audio device may further include the cable providing the signals representing the first and second audio channels, and the communications microphone may be carried by a portion of the cable, possibly by being carried by an upper coupling of the cable by which the cable is able to be coupled to either one of the first and second connectors.

Other features and advantages of the invention will be apparent from the description and claims that follow.

DESCRIPTION OF THE DRAWINGS

FIGS. 3*a* and 3*b* depict a possible electrical architecture of the personal audio devices of either of FIGS. 1 and 2 in which a signal representing an audio channel for acoustic output is conveyed between earpieces regardless of which one of two connectors a cable providing the signal is coupled to.

FIG. 4 depicts another possible electrical architecture of the personal audio devices of either of FIGS. 1 and 2 in which a signal representing an audio channel for acoustic output is conveyed between earpieces regardless of which one of two connectors a cable providing the signal is coupled to.

DETAILED DESCRIPTION

What is disclosed and what is claimed herein is intended to be applicable to a wide variety of personal audio devices, i.e., devices that are structured to be used in a manner in which at least a portion of the devices is positioned on or about the head of a user such that earpieces of the devices are positioned in the vicinities of each of the user's ears, to enable distinct audio channels to be acoustically output to each ear. It should be noted that although various specific embodiments of personal acoustic devices, such as stereo listening headphones and two-way communications headsets are presented with some degree of detail, such presentations of specific embodiments are intended to facilitate understanding through examples, and should not be taken as limiting either the scope of disclosure or the scope of claim coverage.

It is intended that what is disclosed and what is claimed herein is applicable to personal audio devices that are at least able to provide distinct audio channels to each ear of a user. It is intended that what is disclosed and what is claimed herein is applicable to personal audio devices that either do or do not provide two-way communications. It is intended that what is disclosed and what is claimed herein is applicable to personal audio devices having physical configurations structured to at least be able to be worn in the vicinity of both ears of a user, including and not limited to, over-the-head headphones, behind-the-neck headphones, headsets with communications microphones (e.g., boom microphones), as well as hats or helmets incorporating earpieces and perhaps a microphone to enable audio communications. Still other implementations of personal audio devices to which what is disclosed and what is claimed herein is applicable will be apparent to those skilled in the art.

Figure 1:
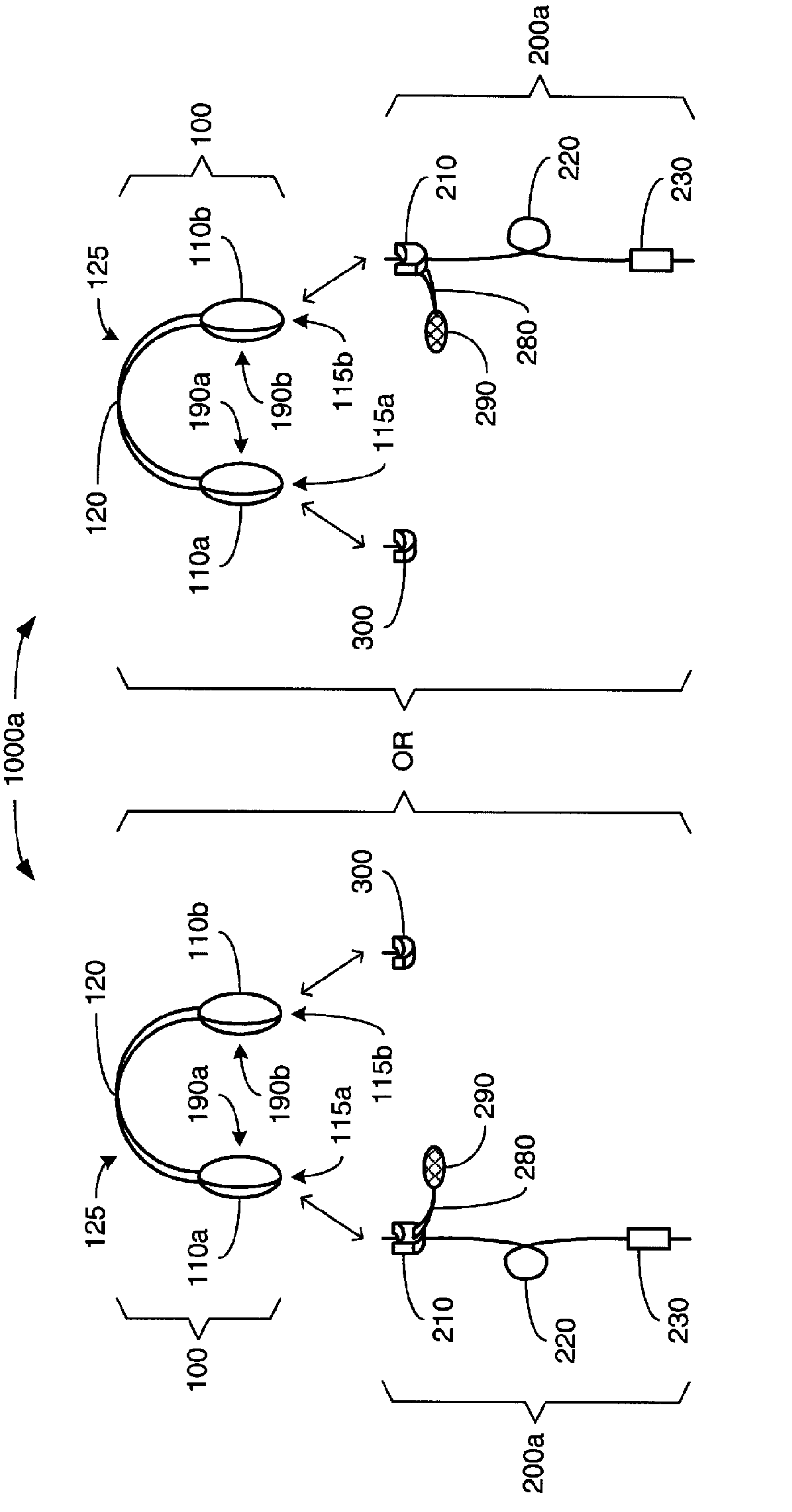
FIGS. 1 and 2 depict possible physical configurations of personal audio devices either with or without a communications microphone.

FIG. 1 depicts an embodiment of a personal audio device 1000*a* having an "over-the-head" physical configuration. The personal audio device 1000*a* incorporates a head assembly 100, a cable assembly 200 and a plug 300. The head assembly 100 incorporates an earpiece 110*a* having an acoustic driver 190*a* and a connector 115*a*, another earpiece 110*b* having an acoustic driver 190*b* and a connector 115*b*, and a headband 120 that couples together the earpieces 110*a* and 110*b*. The cable assembly 200 incorporates an electrically conductive cable 220, an upper coupling 210 to couple one end of the conductive cable 220 to either of the connectors 115*a* and 115*b*, a communications microphone 290, a microphone boom 280 coupling the microphone 290 to the upper coupling 210, and a lower coupling 230 able to couple the other end of the conductive cable 220 to another device. The plug 300 is able to be coupled to whichever one of the connectors 115*a* and 115*b* is not coupled to the upper coupling 210.

The ability to couple the upper coupling 210 of the cable assembly 200 to either of the earpieces 110*a* and 110*b* (via either of the connectors 115*a* and 115*b*, respectively) of the head assembly 100 enables a user of the personal audio device 1000*a* to at least mitigate the inconvenience of being effectively "tethered" to whatever other device to which the personal audio device 1000*a* is coupled through the lower coupling 230 by choosing whether to be tethered from the earpiece 110*a* or the earpiece 110*b*. As will be explained in greater detail, multiple electrical conductors 125 (e.g., electrical cabling or other form of electrical conductors) carried by the headband 120 convey electrical signals between the earpieces 110*a* and 110*b*, and the plug 300 is coupled to whichever one of the connectors 115*a* and 115*b* is not coupled to the upper coupling 210 to enable the use of both of the acoustic drivers 190*a* and 190*b*. With the upper coupling 210 coupled to one of the connectors 115*a* and 115*b*, with the plug 300 coupled to the other of the connectors 115*a* and 115*b*, and with the lower coupling 230 coupled to another device, electrical signals representing sounds detected by the communications microphone 290 and audio to be acoustically output by the acoustic drivers 190*a* and 190*b* are conveyed between the personal audio device 1000*a* and the other device.

To support the ability to couple the upper coupling 210 to either of the connectors 115*a* and 115*b*, the position of the communications microphone 290 relative to the upper coupling 210 may be made alterable to enable the communications microphone 290 to be positioned in the vicinity of the mouth of a user, regardless of which of the earpieces 110*a* and 110*b* the upper coupling 210 is coupled to (via one or the other of the connectors 115*a* and 115*b*, respectively). In some implementations, the ability to alter the position of the communications microphone 290 relative to the upper coupling 210 may be provided by coupling the microphone boom 280 to the upper coupling 210 in a manner that is hinged and/or rotatable. Additionally and/or alternatively, the microphone boom 280 may itself be structured to be flexible enough to be bent by a user, as for example where the microphone boom 280 has a flexible "gooseneck" structure. Regardless of the exact manner in which the communications microphone 290 is able to be positioned to accommodate coupling the upper coupling 210 to either of the earpieces 110*a* and 110*b* (through one or the other of the connectors 115*a* and 115*b*, respectively), the combination of abilities to couple the cable assembly 200 to either of the earpieces 110*a* and 110*b* and to adjust the position of the communications microphone either way can be said to make the personal audio device 1000*a* "reversible" between these two possible conditions.

With the provision of the earpieces 110*a* and 110*b* to enable the acoustic output of audio to each of a user's ears via the acoustic drivers 190*a* and 190*b*, respectively, it is possible for the personal audio device 1000*a* to be coupled via the lower coupling 230 to another device capable only of outputting audio to the personal audio device 1000*a* through the coupling 230 for acoustic output to a user. Such another device may be a CD player, a digital music file player, an entertainment radio, or a television, among other possible devices. However, with the further provision of the communications microphone 290, it is also possible for the personal audio device 1000*a* to be coupled via the lower coupling 230 to another device capable of a two-way exchange of audio through the coupling 230, thereby enabling a user to engage in a conversation. Such another device may be a two-way radio, a telephone or a vehicular intercom system (e.g., an intercom system on an airplane or armored ground vehicle), among other possible devices.

It should be noted that although the depicted embodiment of the personal audio device 1000*a* is of an "over-the-head" physical configuration structured to be worn such that the headband 120 is positioned over the top of a user's head, other embodiments may replace the headband 120 with another form of band, such as a band structured to be worn around the back of a user's head and/or around the back of a user's neck. It should also be noted that although cable assembly 200 is depicted as being a single-piece assembly in which none of the upper coupling 210, the cable 220, the lower coupling 230, the microphone boom 280 and the microphone 290 may be separable from each other, other embodiments of the personal audio device 1000*a* are possible in which one or more of these components are structured to be separable from each other. It should further be noted that although the lower coupling 230 is depicted in a manner suggesting that the lower coupling 230 is a single connector, other embodiments of the personal audio device 1000*a* are possible in which the lower coupling 230 is made up of multiple connectors, possibly conveying electrical signals associated with the acoustic drivers 190*a* and 190*b* separately from signals associated with the communications microphone 290. It should further still be noted that although the communications microphone 290 is depicted as being coupled to the upper coupling 210 through a microphone boom 280, other embodiments of the personal audio device 1000*a* are possible in which the communications microphone 290 is disposed more directly on a portion of the upper coupling 210, and in which perhaps a hollow tube extends from the communications microphone 290 to the vicinity of the mouth of a user to convey speech sounds to the communications microphone 290.

Figure 2:
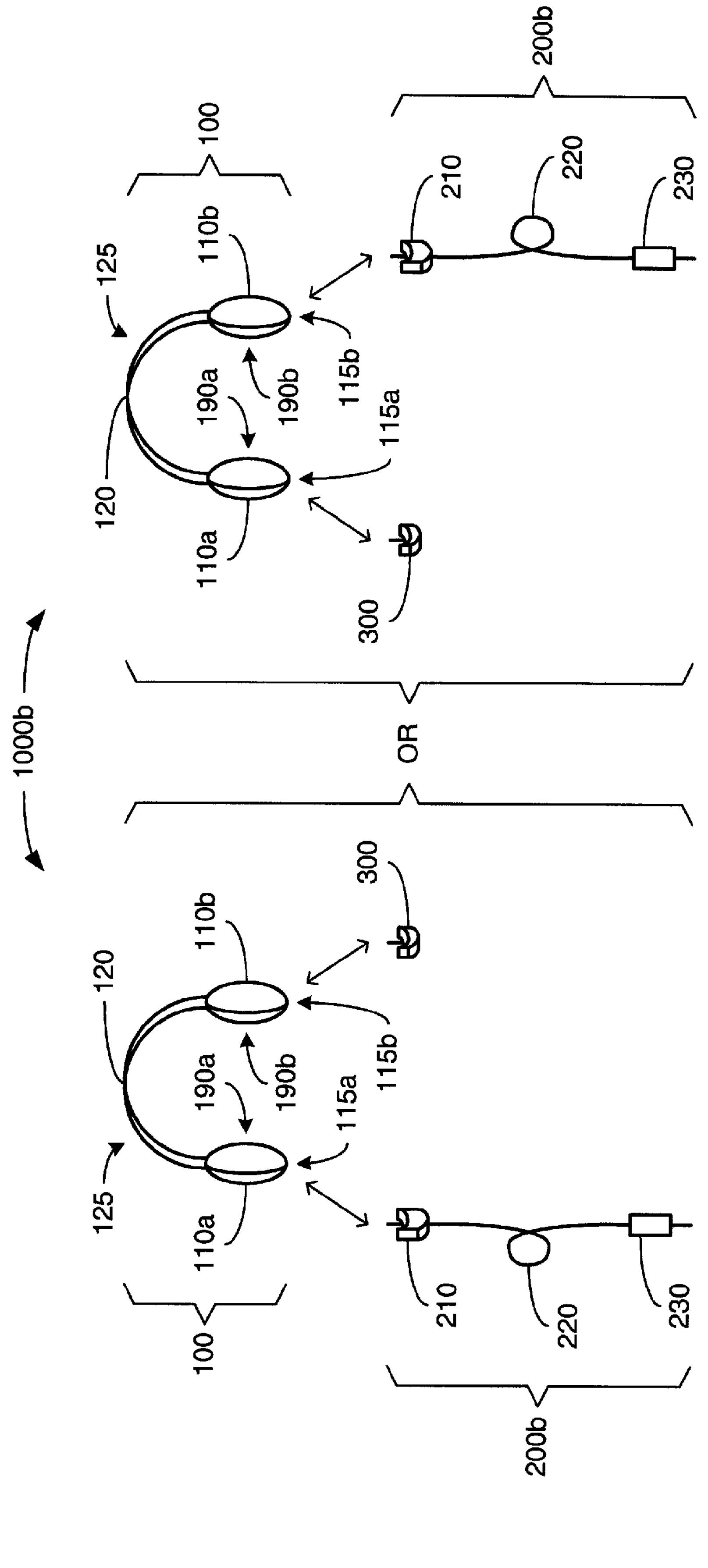

FIG. 2 depicts an embodiment of another personal audio device 1000*b* having an "over-the-head" physical configuration. The personal audio device 1000*b* is substantially similar to the personal audio device 1000*a*. However, the personal audio device 1000*b* differs from the personal audio device 1000*a* at least to the extent that the personal audio device 1000*b* lacks both the communications microphone 290 and the microphone boom 280. In other words, while the personal audio device 1000*a* is structured to enable two-way communications, the personal audio device 1000*b* is structured to enable only acoustic outputting of audio to a user.

Figure 3A:
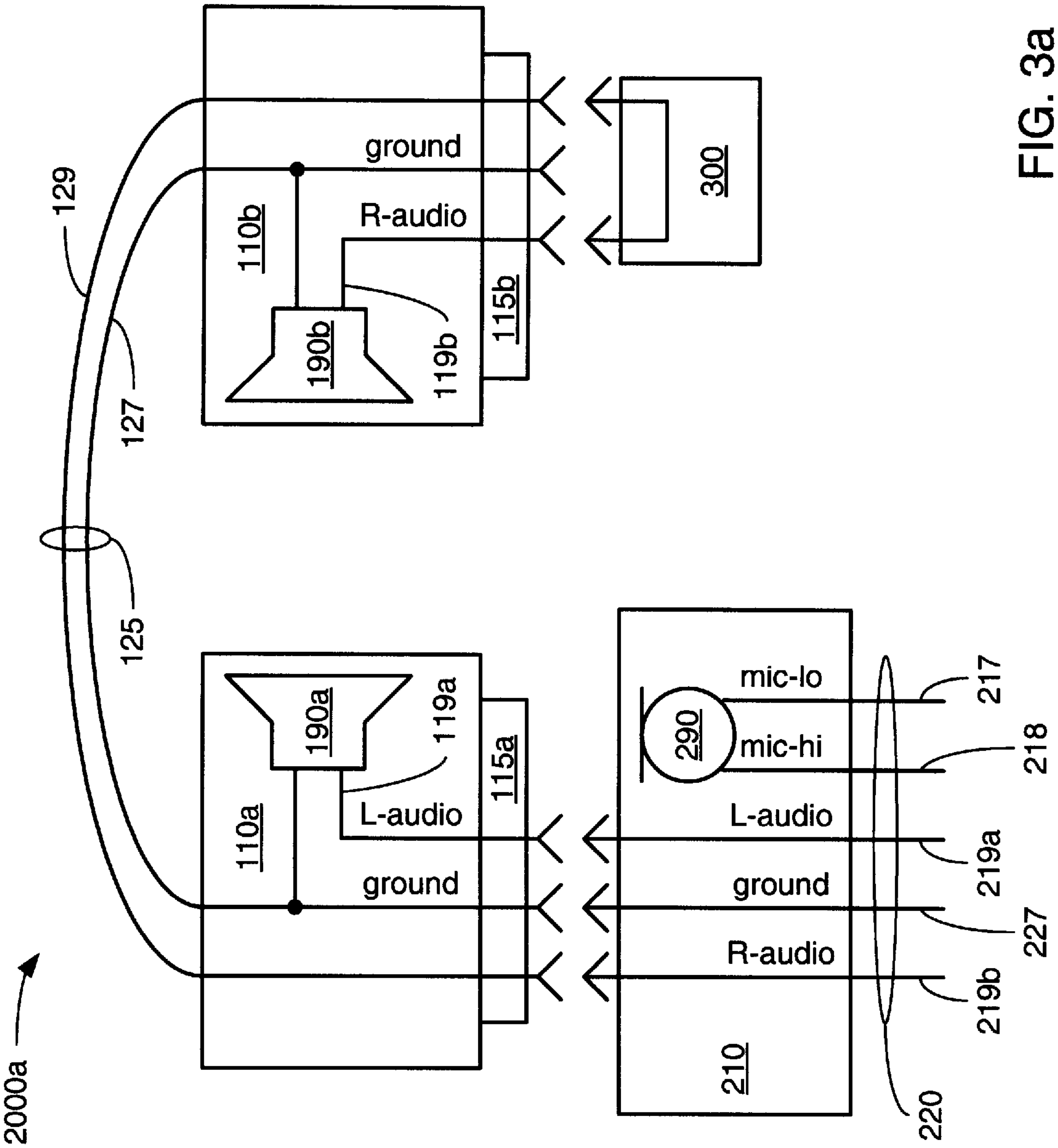
Figure 3B:
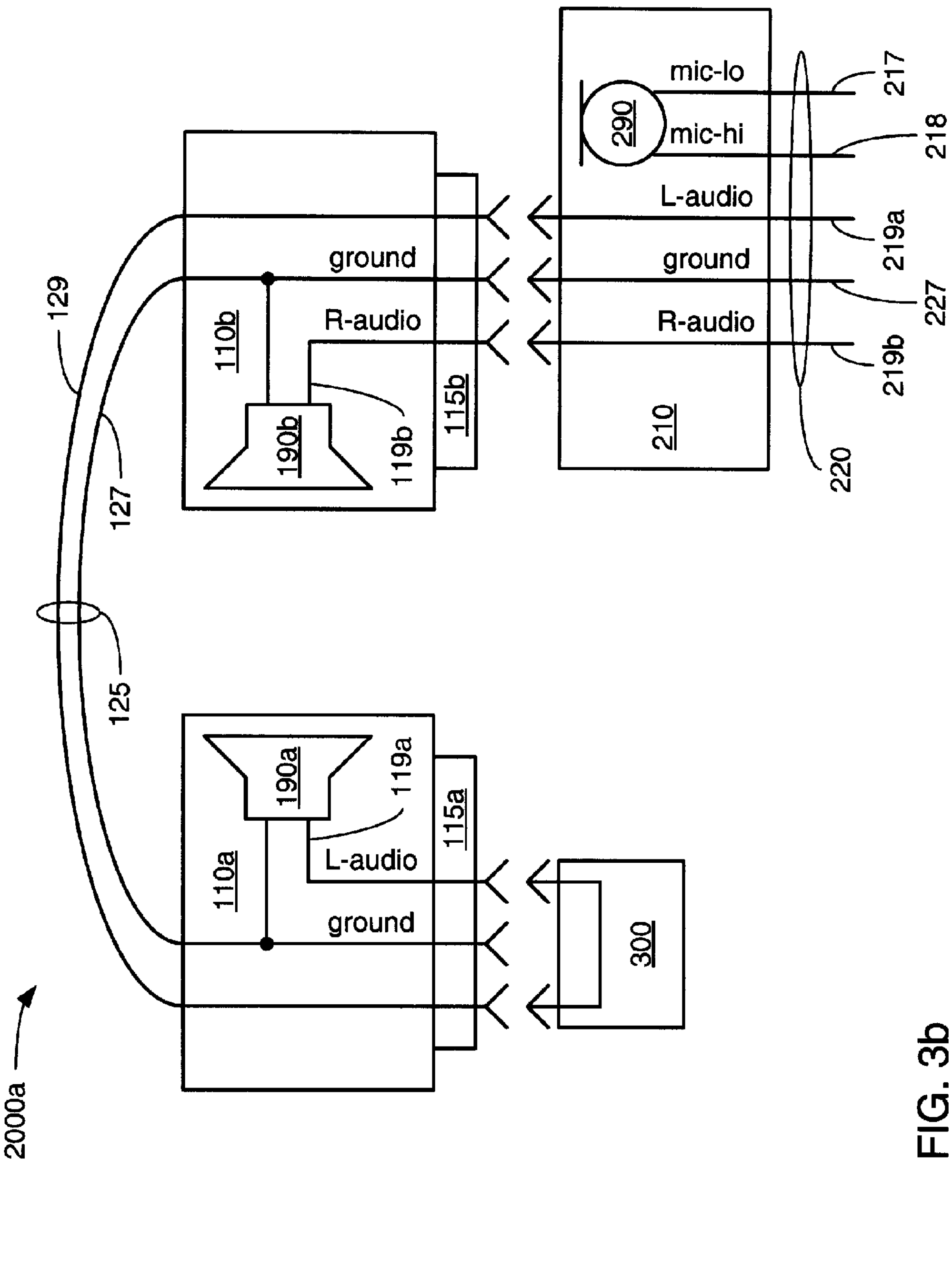

FIGS. 3*a* and 3*b*, taken together, depict an embodiment of an electrical architecture 2000*a* that may be employed by either of the personal audio devices 1000*a* and 1000*b*, although without the communications microphone 290 in the case of the personal audio device 1000*b*. FIG. 3*a* depicts in detail the manner in which electrical signals representing sounds detected by the communications microphone 290 (if present) and audio to be acoustically output by the acoustic drivers 190*a* and 190*b* are conveyed with the upper coupling 210 coupled to the connector 115*a* of the earpiece 110*a* and the plug coupled to the connector 115*b* of the earpiece 110*b*. FIG. 3*b* depicts in detail the manner in which those same electrical signals are conveyed when those same couplings are reversed.

The cable 220 of the cable assembly 200 conveys multiple signals between the upper coupling 210 and the lower coupling 230 (depicted in FIGS. 1 and 2). The cable 220 incorporates a ground conductor 227 to convey ground between the upper coupling 210 and the lower coupling 230. The cable 220 also incorporates a L-audio conductor 219*a* to convey a signal representing left channel audio to be acoustically output by the acoustic driver 190*a*, and a R-audio conductor 219*b* to convey a signal representing right channel audio to be acoustically output by the acoustic driver 190*b* from the lower coupling 230 to the upper coupling 210. Where the electrical architecture 2000*a* is employed by the personal audio device 1000*a* such that the communications microphone 290 is present, the cable 220 further incorporates a mic-lo conductor 217 and a mic-hi conductor 218 to convey signals representing sounds detected by the communications microphone 290 from the upper coupling 210 to the lower coupling 230. The mic-lo conductor 217 and the mic-hi conductor 218 are coupled to the communications microphone 290, which is carried by the upper coupling 210 as previously discussed, and are not conveyed to any part of the head assembly 100.

The electrical conductors 125 of the head assembly 100 convey multiple signals between the earpieces 110*a* and 110*b*. The electrical conductors 125 include a ground conductor 127 to convey ground and a crossover audio conductor 129 to convey an audio signal between the earpieces 110*a* and 110*b*. Within the earpiece 110*a*, the acoustic driver 190*a* is coupled to the ground conductor 127 and to a L-audio conductor 119*a* to be provided with a signal representing left channel audio to be acoustically output by the acoustic driver 190*a*. Further, within the earpiece 110*a*, the L-audio conductor 119*a*, the ground conductor 127 and the crossover audio conductor 129 are each coupled to separate contacts of the connector 115*a*. Similarly, within the earpiece 110*b*, the acoustic driver 190*b* is coupled to the ground conductor 127 and to a R-audio conductor 119*b* to be provided with a signal representing right channel audio to be acoustically output by the acoustic driver 190*b*. Further, within the earpiece 110*b*, the R-audio conductor 119*b*, the ground conductor 127 and the crossover audio conductor 129 are each coupled to separate contacts of the connector 115*b*.

As previously discussed, both of the personal audio devices 1000*a* and 1000*b* are structured to enable the upper coupling 210 to be coupled to either of the connectors 115*a* and 115*b*, and to enable the plug 300 to be coupled whichever one of the connectors 115*a* and 115*b* is not coupled to the upper coupling 210. The connectors 115*a* and 115*b*, the upper coupling 210 and the plug 300 are structured to support these various possible couplings among them through the use of electrical contacts of any of a variety of possible physical configurations, including and not limited to, mating electrical contacts disposed directly on exterior portions of casings and/or distinct connectors employing mating tab and socket contacts or mating wiping contacts.

With the upper coupling 210 coupled to the connector 115*a* as depicted in FIG. 3*a*, the ground conductor 127 of the conductors 125 is coupled to the ground conductor 227 of the cable 220, the L-audio conductor 119*a* within the earpiece 110*a* is coupled to the L-audio conductor 219*a* of the cable 220, and the crossover audio conductor 129 of the conductors 125 is coupled to the R-audio conductor 219*b* of the cable 220. Further, with the plug 300 coupled to the connector 115*b* as also depicted in FIG. 3*a*, the plug 300 couples the crossover audio conductor 129 to the R-audio conductor 119*b* such that the R-audio conductor 119*b* is coupled through the plug 300 and the crossover audio conductor 129 to the R-audio conductor 219*b*.

With the upper coupling 210 coupled to the connector 115*b* as depicted in FIG. 3*b*, the ground conductors 127 and 227 are coupled together, the R-audio conductors 119*b* and 219*b* are coupled together, and the crossover audio conductor 129 is coupled to the L-audio conductor 219*a*. Further, with the plug 300 coupled to the connector 115*a* as also depicted in FIG. 3*b*, the plug 300 couples the crossover audio conductor 129 to the L-audio conductor 119*a* such that the L-audio conductor 119*a* is coupled through the plug 300 and the crossover audio conductor 129 to the L-audio conductor 219*a*.

In this way, signals representing left channel audio are always conveyed to the acoustic driver 190*a* of the earpiece 110*a*, and signals representing right channel audio are always conveyed to the acoustic driver 190*b* of the earpiece 110*b*, regardless of whether the upper coupling 210 is coupled to the connector 115*a* or the connector 115*b*, while also minimizing the quantity of conductors that make up the electrical conductors 125 carried by the headband 120 is minimized. As those skilled in the art will readily recognize, minimizing the quantity of conductors carried by a headband is usually deemed desirable for reasons of minimizing the thickness, complexity, expense and weight of a headband, especially where a headband is structured to have an adjustable length between earpieces to accommodate heads of users that are of different shapes and sizes. As those skilled in the art will also recognize, using a single conductor that is selectively coupled in this manner to convey signals representing either left channel audio or right channel audio between the earpieces 110*a* and 110*b* avoids subjecting either of the signals representing the left or right channel audio to the possible introduction of electromagnetic interference.

Figure 4:
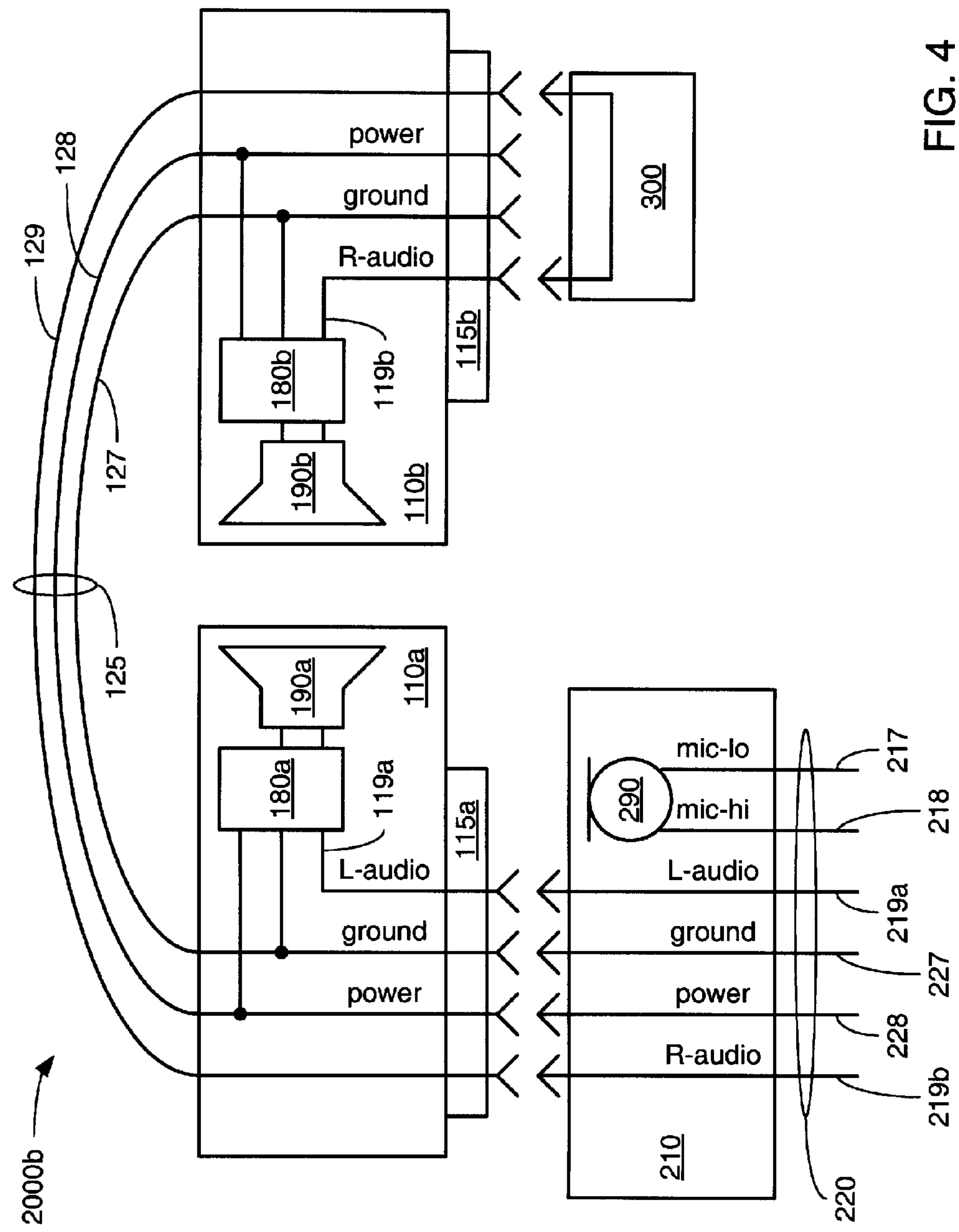

FIG. 4 depicts an embodiment of another electrical architecture 2000*b* that may be employed by either of the personal audio devices 1000*a* and 1000*b*, although without the communications microphone 290 in the case of the personal audio device 1000*b*. The electrical architecture 2000*b* is substantially similar to the electrical architecture 2000*a*. However, the electrical architecture 2000*b* differs from the electrical architecture 2000*a* at least to the extent that a personal audio device adopting the electrical architecture 2000*b* further incorporates powered circuits 180*a* and 180*b* involved in driving the acoustic drivers 190*a* and 190*b*, respectively, to acoustically output audio provided by another device to which the lower coupling 230 may be coupled and/or other audio. In some embodiments of the personal audio device 1000*a* or 1000*b* employing the electrical architecture 2000*b*, the powered circuits 180*a* and 180*b* may be audio amplifiers, and in other embodiments, the powered circuits 180*a* and 180*b* may be active noise reduction (ANR) circuits.

In addition to the conductors previously described as being incorporated into the cable 220, the cable 220 additionally incorporates a power conductor 228 to convey power from the lower coupling 230 to the upper coupling 210. In addition to the conductors previously described as being incorporated into the electrical conductors 125, the electrical conductors 125 additionally include a power conductor 128 to convey power between the earpieces 110*a* and 110*b*. Within the earpiece 110*a*, the acoustic driver 190*a* is coupled to the powered circuit 180*a*, which in turn is coupled to the ground conductor 127, the L-audio conductor 119*a* and the power conductor 128. Similarly, within the earpiece 110*b*, the acoustic driver 190*b* is coupled to the powered circuit 180*b*, which in turn is coupled to the ground conductor 127, the R-audio conductor 119*b* and the power conductor 128. Further, the power conductor 128 is coupled to contacts of the connectors 115*a* and 115*b* of the earpieces 110*a* and 110*b*, respectively. Regardless of whether the upper coupling 210 is coupled to the connector 115*a* or to the connector 115*b*, the power conductor 228 of the cable 220 is coupled to the power conductor 128 of the electrical conductors 125 to convey power to both of the powered circuits 180*a* and 180*b*.

It should be noted that although the embodiments of personal audio devices and associated electrical architectures depicted and discussed herein largely serve the function of positioning acoustic drivers and perhaps a microphone about portions of a user's head, other functions may be additionally incorporated. By way of example, either of the personal audio devices 1000*a* or 1000*b* may further incorporate wireless communications capabilities in addition to the wired communications capabilities enabled through the cable assembly 200 such that either of the electrical architectures 2000*a* or 2000*b* may be augmented with a wireless transceiver accompanied by circuitry to switch between and/or combine wired and wireless communications (or perhaps the powered circuits 180*a* and 180*b* may cooperate to provide wireless communications functionality in the electrical architecture 2000*b*). Also by way of example, either of the personal audio devices 1000*a* or 1000*b* may further incorporate ANR capabilities such that one or both of the earpieces 110*a* and 110*b* may further incorporate one or more feedback and/or feedforward microphones and either of the electrical architectures 2000*a* or 2000*b* may be augmented with one or more ANR circuits to cause anti-noise sounds to be acoustically output by the acoustic drivers 190*a* and 190*b* (or perhaps the powered circuit 180*a* provides ANR to the earpiece 110*a*, and the powered circuit 180*b* provides ANR to the earpiece 110*b* in the electrical architecture 2000*b*). By way of still another example, either of the personal audio devices 1000*a* or 1000*b* may further incorporate audio playback capabilities such that either of the electrical architectures 2000*a* or 2000*b* may be augmented with a storage device and circuitry to play previously recorded audio stored within the storage device.

Other implementations are within the scope of the following claims and other claims to which the applicant may be entitled.

The invention claimed is:

1. A personal audio device comprising:

a first earpiece comprising a first acoustic driver to acoustically output a first audio channel and a first connector;

a second earpiece comprising a second acoustic driver to acoustically output a second audio channel and a second connector;

a band coupling the first and second earpieces;

a crossover audio conductor carried by the band between the first and second earpieces, and coupled to both the first and second connectors to:

convey a signal representing the first audio channel from the second earpiece to the first earpiece to be acoustically output by the first acoustic driver at a time when a cable providing signals representing both the first channel audio and the second channel audio is coupled to the second connector; and convey the signal representing the second audio channel from the first earpiece to the second earpiece to be acoustically output by the second acoustic driver at a time when the cable is coupled to the first connector;

a ground conductor carried by the band between the first and second earpieces, and coupled to both the first and second connectors and both the first and second acoustic drivers;

a power conductor carried by the band between the first and second earpieces, and coupled to both the first and second connectors, wherein power is conveyed through the cable to the power conductor when the cable is coupled to either one of the first and second connectors;

a first powered circuit coupled to the power and ground conductors, and coupled to the first acoustic driver;

a first audio channel conductor coupling the first powered circuit to the first connector to convey the signal representing the first audio channel to the first powered circuit;

a second powered circuit coupled to the power and ground conductors, and coupled to the second acoustic driver;

a second audio channel conductor coupling the second powered circuit to the second connector to convey the signal representing the second audio channel to the second powered circuit; and a plug that couples the first audio channel conductor to the crossover audio conductor when the plug is coupled to the first connector, and that couples the second audio channel conductor to the crossover audio conductor when the plug is coupled to the second connector.

2. The personal audio device of claim 1, wherein at least one of the first powered circuit and the second powered circuit provides active noise reduction in at least one of the first earpiece and the second earpiece.

3. The personal audio device of claim 1, wherein the first and second powered circuits cooperate to provide the personal audio device with wireless communications capabilities.

4. The personal audio device of claim 1, further comprising a communications microphone.

5. The personal audio device of claim 4, wherein the communications microphone is able to be coupled to either one of the first and second connectors.

6. The personal audio device of claim 4, further comprising the cable, wherein the communications microphone is carried by a portion of the cable.

7. The personal audio device of claim 6, wherein the communications microphone is carried by an upper coupling of the cable by which the cable is able to be coupled to either one of the first and second connectors.

8. A personal audio device comprising:

a first earpiece comprising:

a first connector;

a first powered circuit to amplify a signal representing a first audio channel;

a first audio channel conductor coupling the first powered circuit to the first connector; and a first acoustic driver coupled to the first powered circuit to acoustically output the first audio channel;

a second earpiece comprising:

a second connector;

a second powered circuit to amplify a signal representing a second audio channel;

a second audio channel conductor coupling the second powered circuit to the second connector; and a second acoustic driver coupled to the second powered circuit to acoustically output the second audio channel;

a band coupling the first and second earpieces;

a crossover audio conductor carried by the band between the first and second earpieces, and coupled to both the first and second connectors to:

convey the signal representing the first audio channel from the second earpiece to the first earpiece to be acoustically output by the first acoustic driver at a time when a cable providing the signals representing the first channel audio and the second channel audio is coupled to the second connector; and convey the signal representing the second audio channel from the first earpiece to the second earpiece to be acoustically output by the second acoustic driver at a time when the cable is coupled to the first connector; and a ground conductor carried by the band between the first and second earpieces, and coupled to both the first and second connectors and both the first and second powered circuits;

a power conductor carried by the band between the first and second earpieces, and coupled to both the first and second connectors and both the first and second powered circuits; and a plug that couples the first audio channel conductor to the crossover audio conductor when the plug is coupled to the first connector, and that couples the second audio channel conductor to the crossover audio conductor when the plug is coupled to the second connector.

9. The personal audio device of claim 8, wherein at least one of the first powered circuit and the second powered circuit provides active noise reduction in at least one of the first earpiece and the second earpiece.

10. A personal audio device comprising:

a first earpiece comprising:

a first connector;

a first acoustic driver to acoustically output a first audio channel; and a first audio channel conductor coupling the first acoustic driver to the first connector to convey a signal representing the first audio channel to the first acoustic driver;

a second earpiece comprising:

a second connector;

a second acoustic driver to acoustically output a second audio channel; and a second audio channel conductor coupling the second acoustic driver to the second connector to convey a signal representing the second audio channel to the second acoustic driver;

a band coupling the first and second earpieces;

a crossover audio conductor carried by the band between the first and second earpieces, and coupled to both the first and second connectors to:

convey the signal representing the first audio channel from the second earpiece to the first earpiece to be acoustically output by the first acoustic driver at a time when a cable providing the signals representing the first channel audio and the second channel audio is coupled to the second connector; and convey the signal representing the second audio channel from the first earpiece to the second earpiece to be acoustically output by the second acoustic driver at a time when the cable is coupled to the first connector; and a ground conductor carried by the band between the first and second earpieces, and coupled to both the first and second connectors and both the first and second acoustic drivers;

a power conductor carried by the band between the first and second earpieces, and coupled to both the first and second connectors, wherein power is conveyed through the cable to the power conductor when the cable is coupled to either one of the first and second connectors;

a first powered circuit coupled to the power and ground conductors, and coupled to the first acoustic driver;

a first audio channel conductor coupling the first powered circuit to the first connector to convey the signal representing the first audio channel to the first powered circuit;

a second powered circuit coupled to the power and ground conductors, and coupled to the second acoustic driver;

a second audio channel conductor coupling the second powered circuit to the second connector to convey the signal representing the second audio channel to the second powered circuit; and a plug that couples the first audio channel conductor to the crossover audio conductor when the plug is coupled to the first connector, and that couples the second audio channel conductor to the crossover audio conductor when the plug is coupled to the second connector.

* * * * *